Nov. 29, 1932.  E. A. CORBIN, JR  1,889,352
TRANSMISSION FOR VEHICLE WHEELS
Filed March 26, 1928  4 Sheets-Sheet 3

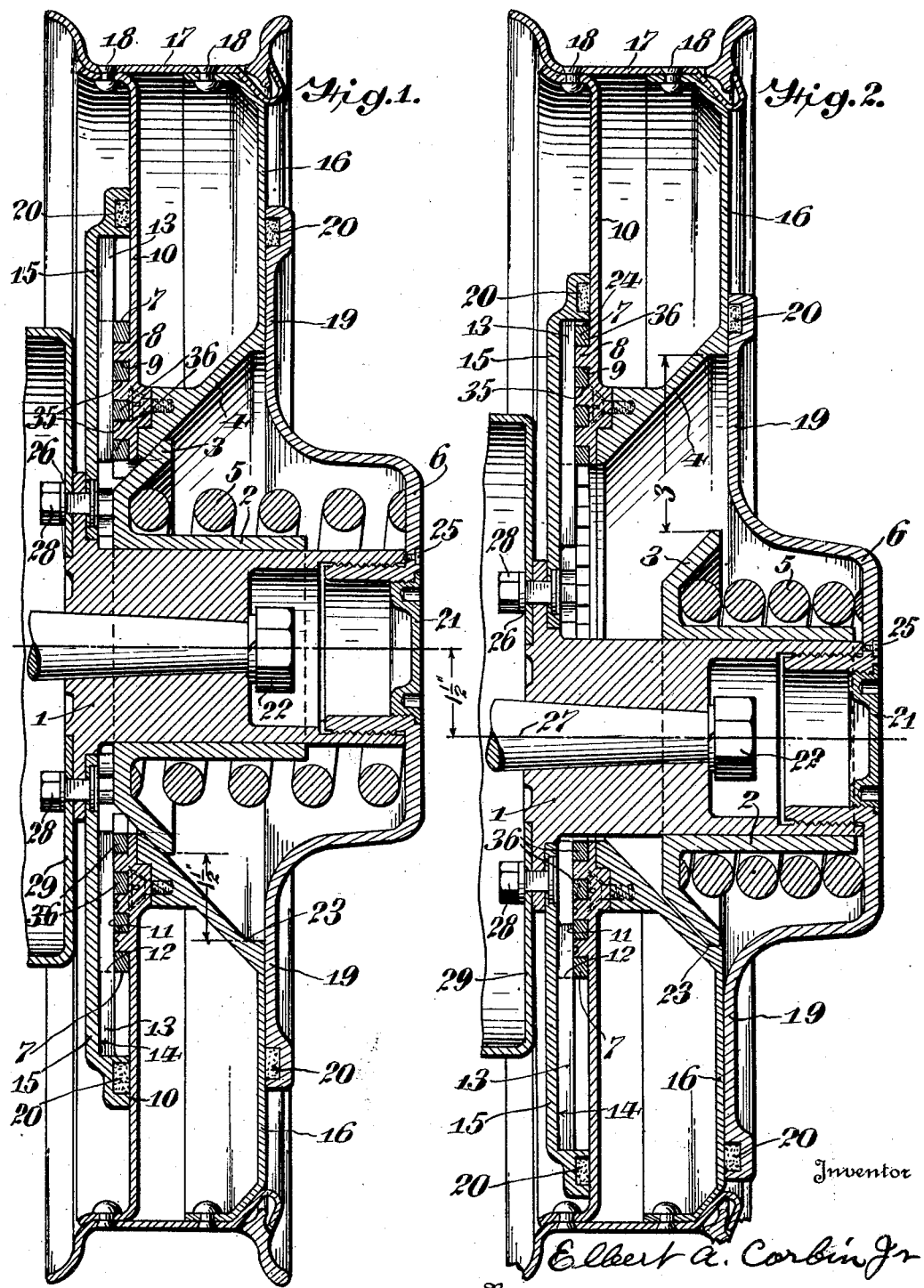

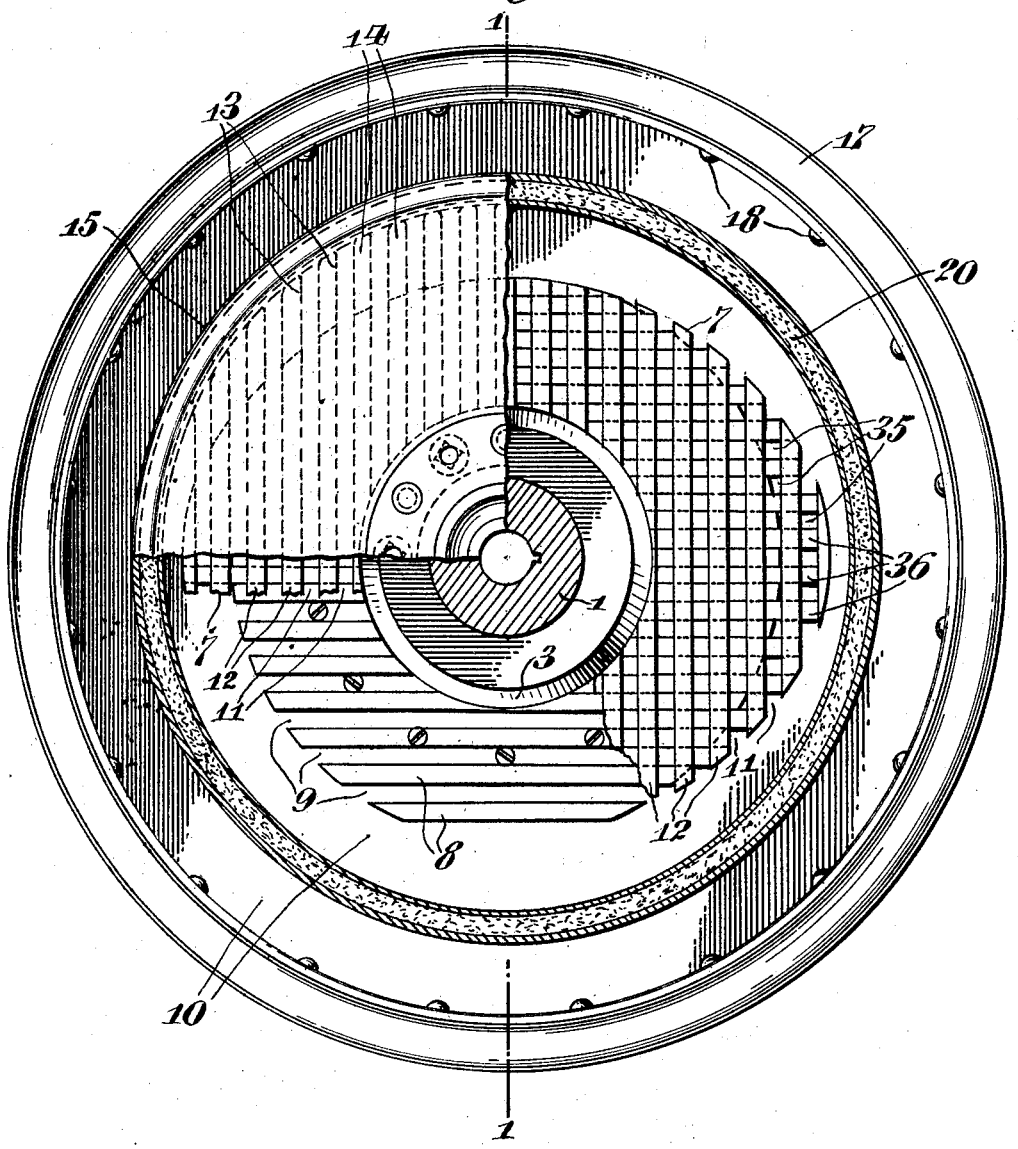

Inventor
Elbert A. Corbin Jr
By Herbert S. Fairbanks
Attorney

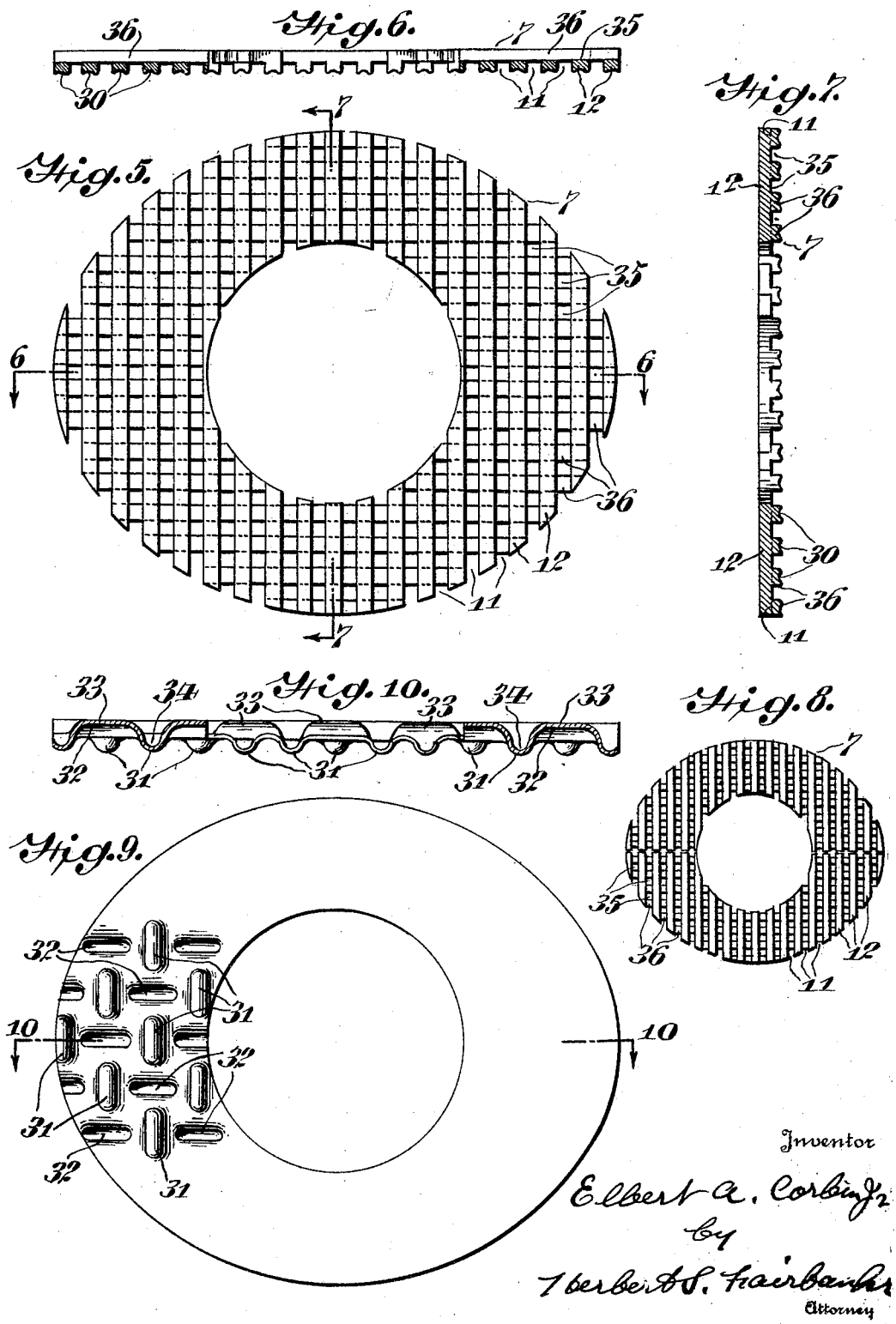

Patented Nov. 29, 1932

1,889,352

UNITED STATES PATENT OFFICE

ELBERT A. CORBIN, JR., OF SWARTHMORE, PENNSYLVANIA, ASSIGNOR OF ONE-THIRD
TO WILLIAM C. BIDDLE, OF LANSDOWNE, PENNSYLVANIA, AND ONE-THIRD TO
WILLIAM A. BROWN, OF PHILADELPHIA, PENNSYLVANIA

TRANSMISSION FOR VEHICLE WHEELS ment of another form of driving member which is formed in sections.

Figure 9 is a plan view of an intermediate driving member which is formed from a stamping.

Figure 10 is a section on line 10—10 of Figure 9.

Similar numerals of reference indicate corresponding parts.

Referring to the drawings:—

Figure 4:
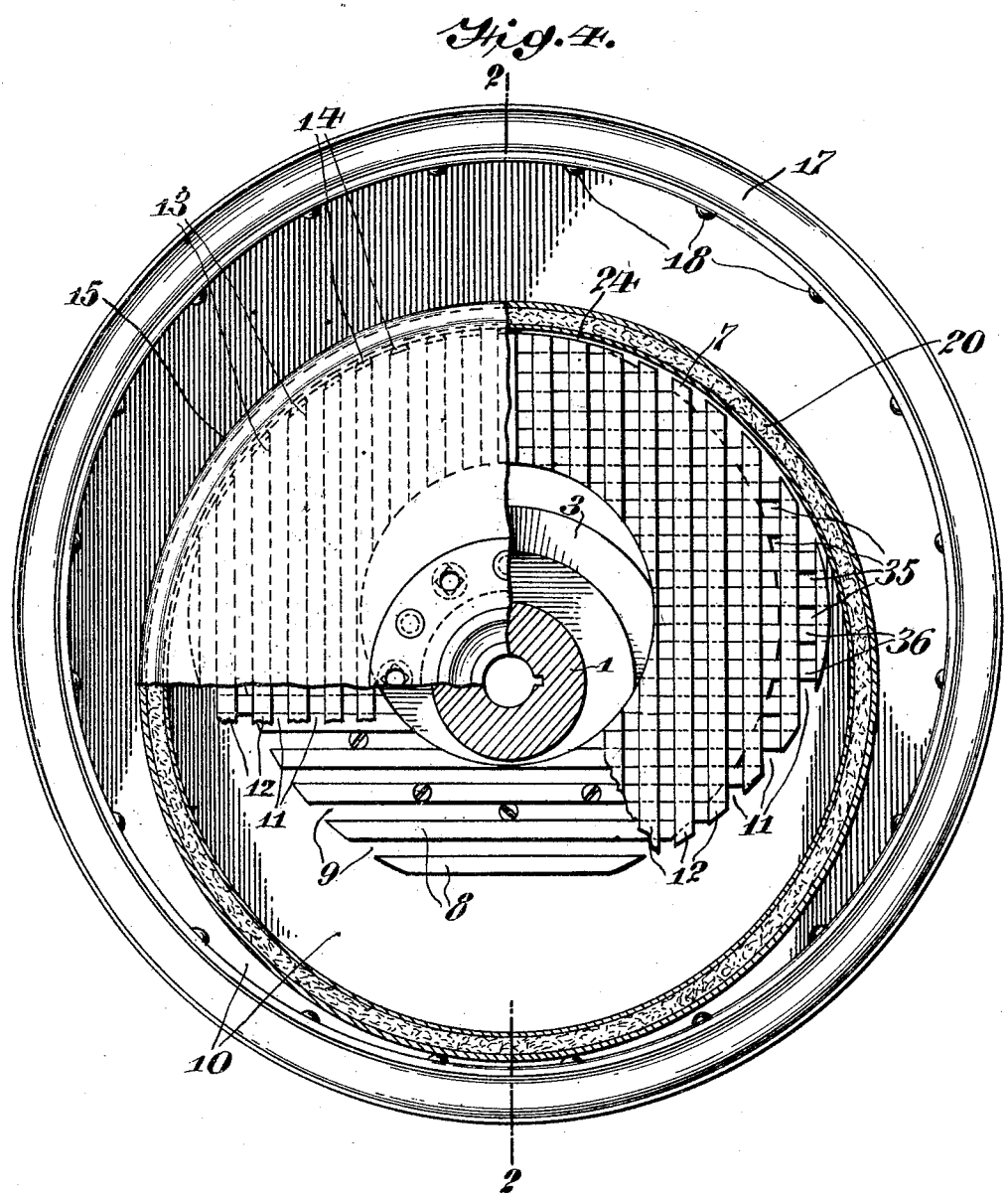

1 designates a hub upon which reciprocates a sleeve 2 having a collar or skirt 3 preferably at 45° with the axis of the hub 1 and supported concentrically when at rest within a cone-shaped bowl 4 by a spring 5 which latter in turn presses against a hub cap 6 which is screwed within the outboard end of the hub 1. The bowl 4 is cone-shaped at the peak and curved at the base forming into a cylinder parallel with the axis of the base and cooperates with the skirt 3 which is cone-shaped and truncated at the peak forming into a cylinder at the base with a smaller radius than that of the base of the bowl, said cylinder being parallel with the axis at said skirt base. This construction provides a positive means for slowing up the action of the wheel upon approaching its position of greatest stress.

The intermediate driving member 7 is in the form of a ring, as illustrated, and meshes with the splines 8 and the flutes 9 of a wheel disc 10 on the member's outboard side while the flutes 11 and the splines 12 of such driving member 7, mesh with coacting splines 13 and flutes 14 of a hub flange 15.

The disc 16, which is part of the cone-shaped bowl 4 and the disc 10, support the tire rim or band 17 and they are attached thereto by fastening devices 18. The hub nut flange or abutment 19 and the hub flange 15 are gasketed at their periphery with the packing 20 to retain the grease or oil used as lubricant within the wheel. The hub cap member 21 is used to close the access hole to the nut 22 which holds the wheel to the axle. The distance between the outside diameter of the skirt 3 on the sleeve 2 and the outside diameter of the bowl at point 23, is shown for the purpose of illustration as being larger by substantially 1½ inches on each side or 3 inches overall in which the skirt 3 can move up or down upon the cone-shaped bowl 4.

In the deflected portion shown in Figure 2 this 1½ inch space has been completely taken up by road or load shock and the space upon the opposite side away from the ground has now increased 3 inches. In other words the parts 4 and 3 have come together on the ground side of the wheel at the point 23 while the point 23 and the skirt 3 are 3 inches apart on the upper side of the wheel. The spring 5 has been closed together against the hub nut 6 by the skirt 3 riding down the cone-shaped bowl 4. In this position the intermediate driving member 7 with its inboard splines and flutes parallel with the ground remains with the hub flange, the splines 12 closing up the space at the upper side of the ring as shown at 24 in Figure 2.

The floating parts of the wheel formed by the discs 10 and 16 and attached to the rim 17 and held within the abutments 15 and 19, the abutment 19 being rigidly attached to the end of the hub 1 by the fastening devices 25, becomes a second hub plate similar to the flange 15 thereby equalizing the construction for side thrusts and allowing the wheel portion to float freely within these two abutments.

It will be noted that the driving ring 7 is fluted and splined in such a manner that it can coact with similar flutes and splines upon the hub plate 15 and the wheel disc 10, so that there may be large areas of impinging surfaces which reduce specific pressures to a minimum and for this reason can be used under any load conditions whatever.

It will be seen that it is easy to apply brake drums, as shown at 26, to the hub without interfering in any way with the deflecting motion of the wheel member. It will also be seen that the packing rings 20 not only make an effective seal between the moving parts to prevent loss of lubricant, but act as a mild lubricator themselves between the inboard and outboard abutments and the wheel discs 10 and 16, effectually covering the coacting surfaces with a film of lubricant and pushing back, during the action of the wheel, silt, grit and other improper substances from the inner working parts of the wheel.

It will also be noticed that by removing the cap 21, the entire structure can be immediately dismounted from the spindle by removing the nut 22 without in any way dismantling the wheel construction.

It will also be seen that the chamber formed by the members, 19, 4, 2 and 1 makes a small compact container for the lubricant and the lubricated parts are enabled to thoroughly churn up the lubricant contained within it so that all of the lubricant is disturbed and used from time to time by the action of the device.

It will also be seen that the center line of the hub members in Fig. 2 is substantially 1½ inches below the hub members of Fig. 1 as shown at point 27. It will be seen in the construction shown in Figs. 1 and 2 that the coacting sleeve and cone-shaped bowl act as a shock absorber and, on account of their shapes, as a rebound dampener and give an indirect spring suspension as all blows are at right angles with the ground and are taken in a direction parallel with the hub and absorbed in the spring 5.

In Fig. 3 the ring 7 is shown in partial elevation and it can be seen that the entire area of both sides of this ring is formed into flutes and splines which coact and mesh with the flutes and splines on the adjacent members 10 and 15, and that the flutes and splines on one side of the driving ring 7 are at 90° with the flutes and splines on the opposite side.

The flutes 11 and splines 12 of the inboard side of the driving ring 7 coact and mesh with the flutes 13 and the splines 14 of the hub plate 15, while the flutes 35 and the splines 36 of the outboard side of the driving ring 7 coact and mesh with the flutes 9 and splines 8 of the wheel member 10.

The disc 15 is connected with the hub 1 by means of fastening devices 28 which also serve to secure in position the brake drum 29.

The construction of the intermediate driving member seen in Figures 1 and 2, will be best understood by reference to Figures 5, 6, and 7, from which it will be seen that this member is in the form of an elliptical or oval ring centrally apertured and provided on each face with splines and flutes arranged in parallelism. The splines and flutes on one face are disposed at right angles to the splines and flutes on the opposite face. The splines are preferably provided with recesses 30 which extend longitudinally of the splines, and for the purpose of illustration they are shown in Figures 6 and 7, but have been omitted from Figures 3 and 4 for the sake of clearness of illustration.

It will be seen from Figure 5 that the entire area on each side of the driving ring is provided with splines and flutes, or in other words with driving elements arranged in rows and in parallelism.

The intermediate driving member seen in Figure 8 is similar to that seen in Figure 5 except that it is split on its long or short diameters, or both, to form sections.

When a sectional ring or driving member of this character is assembled in place between the two coacting members, it will not become disassembled during operation. It will thus be understood that the intermediate driving member may be formed of one or more sections. This member may be formed from a casting, or it may be die cast metal, and is softer than the surfaces with which it coacts.

This driving member can also be made of a stamping as shown in Figures 9 and 10. In this embodiment it is stamped from a single sheet of thin metal, preferably bronze, and instead of having the splines and flutes continuous in the direction of their lengths they are as shown in Figure 9. This enables one to use a thin gauge metal and materially lightens and cheapens the cost of such member. As shown in Figure 9 the driving elements 31 are interrupted by the indentations 32 which form on the opposite side the driving elements 33. These driving elements 33 are interrupted by the indentations 34 which contribute to form the driving elements 31 on the opposite side of the driving member.

In Figure 3 I have shown the parts concentric while in Figure 4 the parts have reached their approximate ultimate position. The spring 5 tends to maintain the two revoluble members in axial alignment and the coacting sleeve and cone-shaped bowl serve as a compensating and shock absorbing device and on account of their shape, as a rebound dampener and provide an indirect spring support since all blows are at right angles to the ground and are taken in a direction parallel with the hub and are absorbed in the spring 5. The surfaces of the driving elements are subjected to light specific pressure when torque occurs.

Any position assumed by the wheel when in action which changes the position between the intermediate power transmitting element and the discs 15 and 10 provide an even and an automatic readjusted position of these three coacting members at all times, no matter how great the torque may be, the speed of rotation of the wheel, or the intensity of the road or load shock to which the wheel is subjected.

The frictional engagement of the two supporting members of the vehicle wheel is such that at its position of greatest stress, the cooperating curved surfaces merge into the conical and cylindrical surfaces and serve to progressively restrict and retard the maximum movement of the parts, and thus absorb the shocks which would otherwise be present under such conditions. This causes a gradual building up of a frictional resistance which overcomes the liability of any of the parts to become broken or distorted under abnormal shocks and stresses.

The driving engagement is of such a character that the total length of the driving elements is of greater length than the diameter of the inner member, and this driving means is distributed over substantially the entire side walls of the intermediate driving element, it of course being understood that the driving elements formed by the splines are disposed in spaced relationship, preferably over the entire area of the intermediate power transmitting member.

There is a continuous torque on the driven members which eliminates any lash or reversal of the torque such as takes place with a sudden shock or braking action on wheel constructions as heretofore employed.

In so far as I am aware I am the first in the art to devise and to employ an intermediate driving member made in sections or an intermediate driving member having an elliptical or oval contour with substantially its entire area on each side provided with driving elements, the total length of which is greater than the vertical or lateral diameter of such member, or one wherein the driving elements are arranged in rows with the rows on one face at an angle to the rows on the opposite face and I therefore desire my claims to such features to receive a broad and generic interpretation.

Having thus described my invention what I claim as new and desire to secure by Letters Patent, is:—

1. The herein described power transmitting member in the form of a sectional disc having projecting from opposite faces spaced driving elements arranged in rows with the rows on one face disposed at an angle to the rows on the opposite face in combination with a driving and driven member in splined relation with said driving elements.

2. The herein described power transmitting member in the form of an elliptical sectional ring having projecting from opposite faces spaced driving elements arranged in rows with the rows on one face disposed at an angle to the rows on the opposite face in combination with a driving and driven member in splined relation with said driving elements.

3. The herein described power transmitting member, comprising a sectional ring the sections of which are maintained in cooperative relationship by coacting with driving and driven parts, said ring having projecting from opposite faces spaced driving elements arranged in rows with the rows on one face disposed at an angle to the rows on the opposite face in combination with a driving and driven member in splined relation with said driving elements.

ELBERT A. CORBIN, Jr.